(12) United States Patent
Su et al.

(10) Patent No.: US 10,839,140 B2
(45) Date of Patent: Nov. 17, 2020

(54) PAGE DISPLAYING METHOD, APPARATUS BASED ON H5 WEBPAGE, AND COMPUTER READABLE STORAGE MEDIUM

(71) Applicant: BAIDU ONLINE NETWORK TECHNOLOGY (BEIJING) CO., LTD., Beijing (CN)

(72) Inventors: Hong Su, Beijing (CN); Peng Wang, Beijing (CN); Ruisheng Wu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/364,724

(22) Filed: Mar. 26, 2019

(65) Prior Publication Data
US 2019/0392025 A1  Dec. 26, 2019

(30) Foreign Application Priority Data

Jun. 25, 2018 (CN) .......................... 2018 1 0663166

(51) Int. Cl.
*G06F 17/00* (2019.01)
*G06F 40/14* (2020.01)
(Continued)

(52) U.S. Cl.
CPC ............ *G06F 40/14* (2020.01); *G06F 3/0483* (2013.01); *G06F 40/106* (2020.01);
(Continued)

(58) Field of Classification Search
CPC ...... G06F 40/14; G06F 40/106; G06F 40/117; G06F 3/0483; G06F 3/167; G06F 3/017; G06F 8/38
See application file for complete search history.

(56) References Cited

U.S. PATENT DOCUMENTS 8,245,125 B1 * 8/2012 Pupius .................. G06F 16/957
715/208
8,689,117 B1 * 4/2014 Vasilik ................ G06F 16/9577
715/760
(Continued)

FOREIGN PATENT DOCUMENTS

| CN | 103246739 A | 8/2013 |
|---|---|---|
| CN | 104866347 A | 8/2015 |

(Continued)

OTHER PUBLICATIONS

Japanese Patent Application No. 2019-037155, Office Action dated Apr. 28, 2020, 3 pages.
(Continued)

*Primary Examiner* — Laurie A Ries
(74) *Attorney, Agent, or Firm* — Lathrop GPM LLP

(57) ABSTRACT

The present disclosure provides a page displaying method, device, apparatus based on an H5 webpage, and a computer readable storage medium. The page displaying method based on an H5 webpage includes: loading a main page in a webpage view; obtaining content of an H5 webpage; establishing a page tag, in which the page tag includes the content of the H5 webpage; and loading the page tag in the main page.

15 Claims, 4 Drawing Sheets

(51) Int. Cl.
*G06F 40/117* (2020.01)
*G06F 40/106* (2020.01)
*G06F 3/0483* (2013.01)
*G06F 3/01* (2006.01)
*G06F 3/16* (2006.01)

(52) U.S. Cl.
CPC ............ *G06F 40/117* (2020.01); *G06F 3/017* (2013.01); *G06F 3/167* (2013.01)

(56) References Cited

U.S. PATENT DOCUMENTS

| | | | |
|---|---|---|---|
| 9,420,031 B2* | 8/2016 | Zhao | H04L 67/02 |
| 9,495,339 B2* | 11/2016 | Cheng | G06F 40/134 |
| 9,690,763 B1* | 6/2017 | Lee | G06F 16/954 |
| 10,387,549 B2* | 8/2019 | Williamson | G06F 40/146 |
| 10,747,943 B2* | 8/2020 | Weng | G06F 40/14 |
| 2013/0132833 A1* | 5/2013 | White | G06F 11/3438 |
| | | | 715/704 |
| 2013/0174033 A1* | 7/2013 | Hanukaev | G06F 3/0488 |
| | | | 715/273 |
| 2013/0205244 A1* | 8/2013 | Decker | G06F 3/04845 |
| | | | 715/777 |
| 2013/0305170 A1* | 11/2013 | de Souza | G06Q 30/02 |
| | | | 715/760 |
| 2014/0033023 A1* | 1/2014 | Yang | G06F 40/14 |
| | | | 715/234 |
| 2014/0143644 A1* | 5/2014 | Smedberg | G06Q 50/16 |
| | | | 715/205 |
| 2014/0298159 A1* | 10/2014 | Kim | G06F 40/14 |
| | | | 715/234 |
| 2015/0278164 A1* | 10/2015 | Kim | G06F 40/106 |
| | | | 715/273 |
| 2016/0026730 A1* | 1/2016 | Hasan | G06F 40/117 |
| | | | 715/234 |
| 2018/0307775 A1* | 10/2018 | Eom | G06Q 50/10 |
| 2019/0079908 A1* | 3/2019 | Weng | G06F 40/14 |
| 2019/0108189 A1* | 4/2019 | Wang | G06F 16/9577 |

FOREIGN PATENT DOCUMENTS

| | | |
|---|---|---|
| CN | 105260421 A | 1/2016 |
| CN | 105549806 A | 5/2016 |
| CN | 106919707 A | 7/2017 |
| CN | 106919709 A | 7/2017 |
| CN | 107229749 A | 10/2017 |
| CN | 103955475 B * | 4/2018 |
| JP | 2000112610 A | 4/2000 |
| JP | 2012014418 A | 1/2012 |
| JP | 2014511525 A | 5/2014 |

OTHER PUBLICATIONS

Japanese Patent Application No. 2019-037155, English translation of Office Action dated Apr. 28, 2020, 3 pages.
Chinese Patent Application No. 201810663166.X, First Office Action dated Apr. 19, 2019, 5 pages.
Chinese Patent Application No. 201810663166.X, Second Office Action dated Jul. 31, 2019, 5 pages.
Chinese Patent Application No. 201810663166.X, English translation of First Office Action dated Apr. 19, 2019, 5 pages.
Chinese Patent Application No. 201810663166.X, English translation of Second Office Action dated Jul. 31, 2019, 5 pages.
Electron Study notes https://www.cnblogs.com/zhengweijie/p/8011438.html; Dec. 13, 2017; cited in Chinese Patent Application No. 201810663166.X Second Office Action dated Jul. 31, 2019, 5 pages.
English translation of Electron Study notes https://www.cnblogs.com/zhengweijie/p/8011438.html; Dec. 13, 2017; cited in Chinese Patent Application No. 201810663166.X Second Office Action dated Jul. 31, 2019, 8 pages.

* cited by examiner

PAGE DISPLAYING METHOD, APPARATUS BASED ON H5 WEBPAGE, AND COMPUTER READABLE STORAGE MEDIUM

CROSS-REFERENCE TO RELATED APPLICATION

The present application is based upon and claims priority to Chinese Patent Application No. 201810663166.X, filed on Jun. 25, 2018, the entirety contents of which are incorporated herein by reference.

FIELD

The present disclosure relates to a webpage production field, and more particularly to a page displaying method, an apparatus based on an H5 webpage, and a computer readable storage medium.

BACKGROUND

The fifth generation Hyper Text Markup Language (HTML 5, H5) may be used in producing webpages in mobile devices. The mobile device returns interaction information in a form of an H5 webpage, such as an H5 weather forecast, H5 encyclopedias, an H5 music, an H5 video, and the like. The current loading of H5 webpages is based on a webpage view provided by the mobile device. For example, when displaying a chatting interface, a list is needed, and each item of the list loads an H5 webpage through a webview. That is, each H5 webpage needs a webview to load. If the results returned by the chat are all in the form of H5 webpage, a lot of webviews are required for loading.

SUMMARY

Embodiments of the present disclosure provide a page displaying method apparatus based on an H5 webpage, and a computer readable storage medium.

Embodiments of the present disclosure provide a page displaying method based on an H5 webpage, including: loading a main page in a webpage view; obtaining content of an H5 webpage; establishing a page tag, in which the page tag includes the content of the H5 webpage; and loading the page tag in the main page.

Embodiments of the present disclosure provide a page displaying device based on an H5 webpage, including: a first loading module, configured to load a main page in a webpage view; an obtaining module, configured to obtain content of an H5 webpage; an establishing module, configured to establish a page tag, in which the page tag includes the content of the H5 webpage; and a second loading module, configured to load the page tag in the main page.

A possible design according to a third aspect of the present disclosure provides a page displaying apparatus based on an H5 webpage, includes: a processor and a memory. The memory is configured to store programs that support the page displaying apparatus based on an H5 webpage to perform the method according to the first aspect of the present disclosure. The processor is configured to perform the programs stored in the memory. The page displaying apparatus based on an H5 webpage may further includes a communication interface, configured to communicate with other devices or communication networks based on the page displaying apparatus based on an H5 webpage.

Embodiments according to a fourth aspect of the present disclosure provide a computer readable storage medium, configured to store computer software instructions performed by the page displaying apparatus based on an H5 webpage. The computer readable storage medium includes programs used to perform the method according to the first aspect of the present disclosure.

The above summary is merely for description of the specification, and is not intended to limit the specification in any way. In addition to above described exemplary aspects, embodiments and features, further aspects, embodiments and features of the present disclosure will be easy to understand with reference to the drawings and following detailed descriptions.

BRIEF DESCRIPTION OF THE DRAWINGS

In the drawings, unless particular specified, the same reference numerals throughout multiple drawings refer to same or similar components or elements. These drawings are necessarily to be drawn to scale. It should be understood that these drawings merely describe some embodiments of the present disclosure, and shall not be construed to limit the scope of the present disclosure.

DETAILED DESCRIPTION

In the following, merely some exemplary embodiments are simply described. It would be appreciated by those skilled in the art that changes can be made in the described embodiments in various ways without departing from spirit or scope of the present disclosure. Therefore, the drawings and the descriptions are constructed to be essentially illustrative rather than restrictive.

Embodiments of the present disclosure mainly provide a page displaying method and device based on an H5 webpage. Followings are an expanded description of the technical solution.

Figure 1:
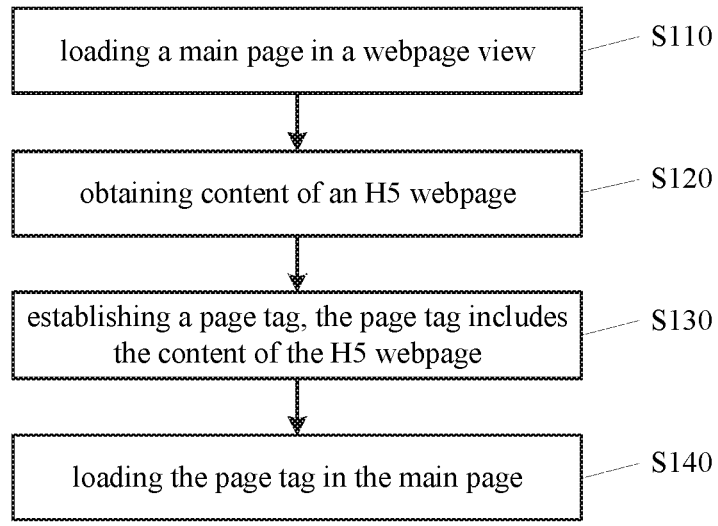
FIG. 1 is a flow chart of a page displaying method based on an H5 webpage according to an embodiment of the present disclosure.

As illustrated in FIG. 1, embodiments of the present disclosure provide a page displaying method based on an H5 webpage. The method includes follows.

At block S110, a main page (also called a main.html) is loaded in a webpage view (also called a webview).

At block S120, content of an H5 webpage is obtained.

At block S130, a page tag (also called an html tag) is established, the page tag includes the content of the H5 webpage.

At block S140, the page tag is loaded in the main page.

The webview is a widget that can be used to load (i.e. display) a webpage, and can be understood as a browser. The main.html is a main file. A main interface is displayed by loading the main.html. Content of each H5 webpage may be separately loaded into the main.html in a form of page tag, such that the content of the H5 webpage is displayed. When content of a new H5 webpage is to be loaded, a new page tag may be established. This new page tag includes content of the new H5 webpage. This new page tag is added into the main.html and is loaded, such that the content of the new H5 webpage is displayed.

Loading a page tag is faster than loading an H5 webpage by using a webview, and less memory is occupied. With the page displaying method according to embodiments of the present disclosure, all H5 webpages can be loaded with only one webview, such that a speed of loading the H5 webpage can be accelerated, and less memory is occupied, making the page displaying more smoothly.

In an embodiment of the present disclosure, at block S130, a displaying pattern of the content of the H5 webpage may be set based on a function provided by Javascript and/or Css, and the page tag is established according to the displaying pattern.

In another embodiment of the present disclosure, at block S130, an operation button may be set in the page tag based on a function provided by Javascript and/or Css.

Javascript is a literal translation scripting language that can be used to add dynamic function to an HTML page. Css (Cascading style sheets) is a computer language that can be used to represent an HTML page. Javascript and Css may provide different interfaces, that is, may define basic functional functions of the pattern. The displaying pattern may be set through these functions, such that the displaying pattern of the content of the H5 webpage may be flexibly controlled. The operation button (such as a click, a skip, and so on) may be set when the page tag is established through these functions, so as to control modes of interaction with a user.

Figure 2:
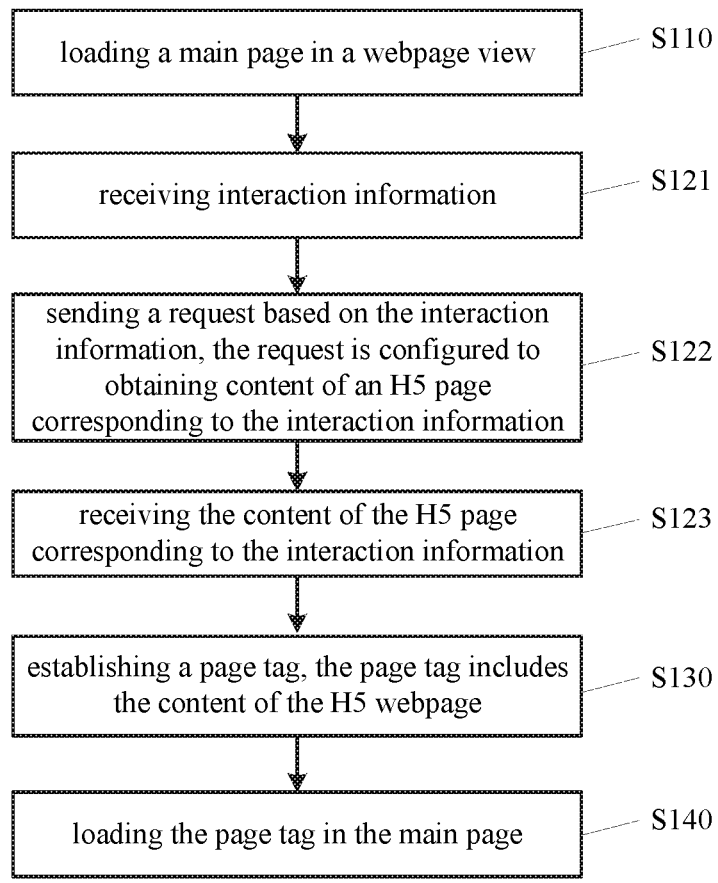
FIG. 2 is a flow chart of a page displaying method based on an H5 webpage according to another embodiment of the present disclosure.

In another embodiment of the present disclosure, as illustrated in FIG. 2, the action at block S120 includes follows.

At block S121, interaction information is received. The interaction information includes at least one of speech interaction information, text interaction information and image interaction information. The image interaction information includes gesture interaction information. The interaction information is from the user, so as to provide multiple interaction means.

At block S122, a request is sent based on the interaction information. The request is configured to obtain content of an H5 page corresponding to the interaction information. For example, the request is sent to a server through the network.

At block S123, the content of the H5 page corresponding to the interaction information is received. For example, the content of the H5 page is received from the server through the network.

The above page displaying method may be applied to an interaction interface of a mobile terminal, such as chat interface in a smart phone. A detailed example of the above page displaying method applied in the chat interface is given with reference to FIG. 3.

Figure 3:
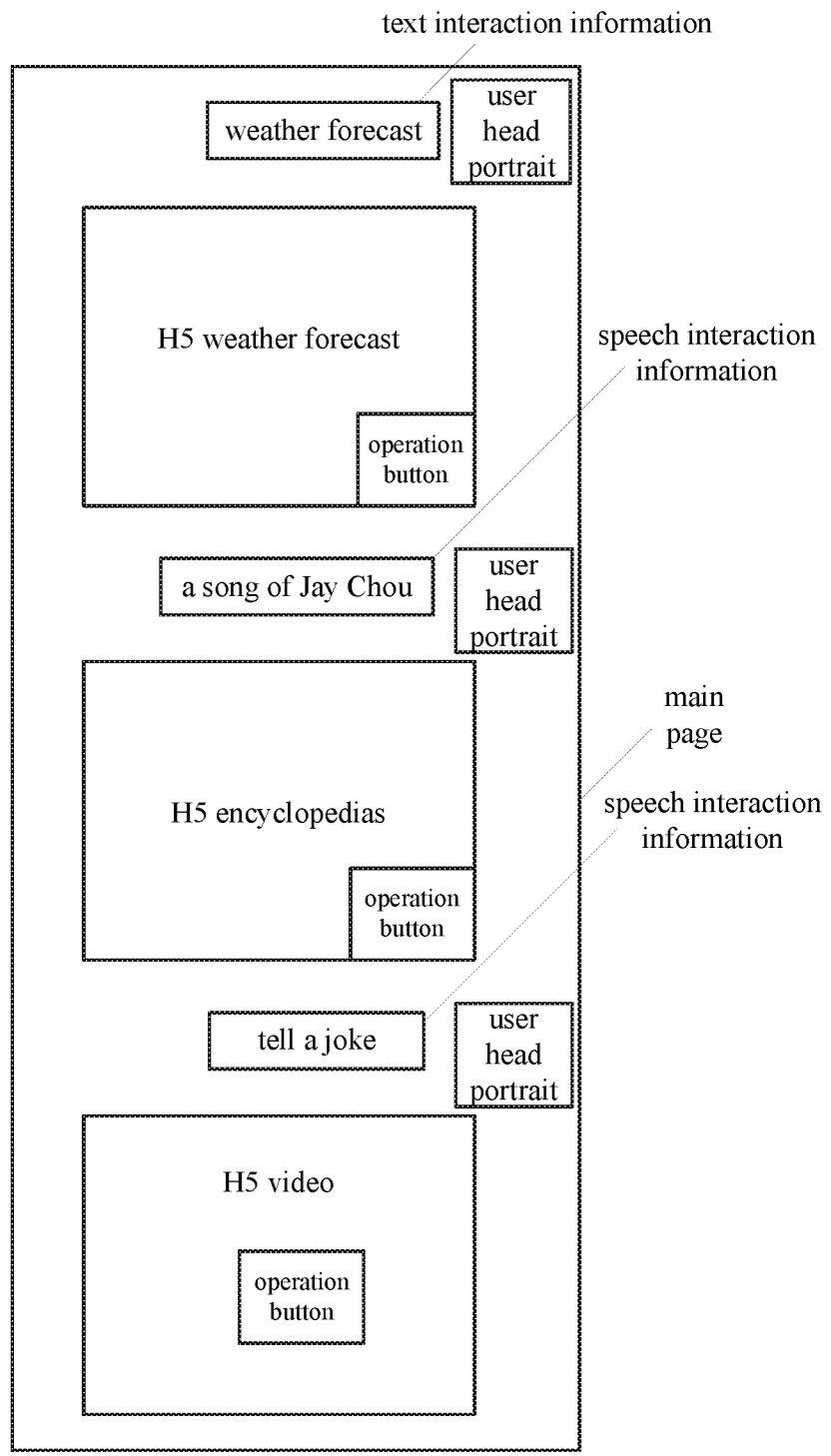
FIG. 3 is a schematic diagram illustrating page displaying effect based on an H5 webpage according to an embodiment of the present disclosure.

As illustrated in FIG. 3, at block S110, a main.html is loaded through a webview, a main page of a chat interface is displayed, a user head portrait may be loaded in the main page through establishing a page tag, and a position of the user head portrait may be set based on a function provided by Javascript and Css.

At block S121, interaction information of the user is received. For example, text interaction information "weather forecast" is received. At block S122, a request for obtaining content of "H5 weather forecast" corresponding to "weather forecast" is sent, according to the text interaction information "weather forecast", to the server through the network. At block S123, content of "H5 weather forecast" is received from the server through the network.

At block S130, a page tab including the content of "H5 weather forecast" is established. The displaying pattern of the content of "H5 weather forecast" may be set based on a function provided by Javascript and/or Css. For example, preview key information such as temperature, humidity, a region and the like may be set. An operation button may be established based on a function provided by Javascript and/or Css. For example, an operation button "viewing more" is established. After the operation button is clicked, a content details page of "H5 weather forecast" is displayed. A position of the operation button may be set. For example, the operation button may be located at lower right corner or in the center.

At block S140, a page tag of "H5 weather forecast" is loaded in the main page, then the content "H5 weather forecast" is displayed according to the displaying pattern and the operation button set at block S130.

Content of each new H5 webpage is loaded in a form of the page tag. For example, at block S121, speech interaction information "a song of Jay Chou" is received. At block S122, a request is sent. At block S123, content "H5 encyclopedias" corresponding to "a song of Jay Chou" is received. At block 130, a page tag including content "H5 encyclopedias" is established. At block S140, the page tag of "H5 encyclopedias" is loaded in the main page, and the content of "H5 encyclopedias" is displayed.

For another example, at block S121, speech interaction information "tell a joke" is received. At block S122, a request is sent. At block S123, content "H5 video" corresponding to "tell a joke" is received. At block 130, a page tag including content "H5 video" is established, an operation button is established based on a function provided by Javascript and Css, and a displaying position of the operation button is set in the center. At block S140, the page tag of "H5 video" is loaded in the main page, and the content "H5 video" is displayed according to the displaying pattern and the operation button set at block S130.

Figure 4:
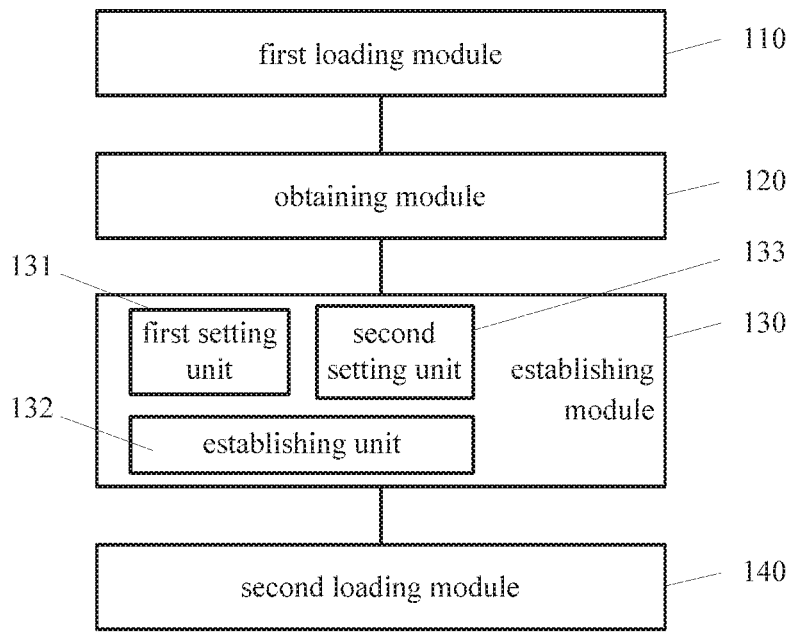
FIG. 4 is a block diagram illustrating a page displaying device based on an H5 webpage according to an embodiment of the present disclosure.

Embodiments of the present disclosure further provide a page displaying device based on an H5 webpage. As illustrated in FIG. 4, the page displaying device includes: a first loading module 110, an obtaining module 120, an establishing module 130, and a second loading module 140.

The first loading module 110 is configured to load a main page in a webpage view.

The obtaining module 120 is configured to obtain content of an H5 webpage.

The establishing module 130 is configured to establish a page tag corresponding to the content of the H5 webpage.

The second loading module 140 is configured to load the page tag in the main page.

The establishing module 130 includes a first setting unit 131, an establishing unit 132 and a second setting unit 133.

The first setting unit 131 is configured to set a displaying pattern of the content of the H5 webpage based on a function provided by Javascript and/or Css.

The establishing unit 132 is configured to establish the page tag according to the displaying pattern.

The second setting unit 133 is configured to set an operation button in the page tag based on a function provided by Javascript and/or Css.

Figure 5:
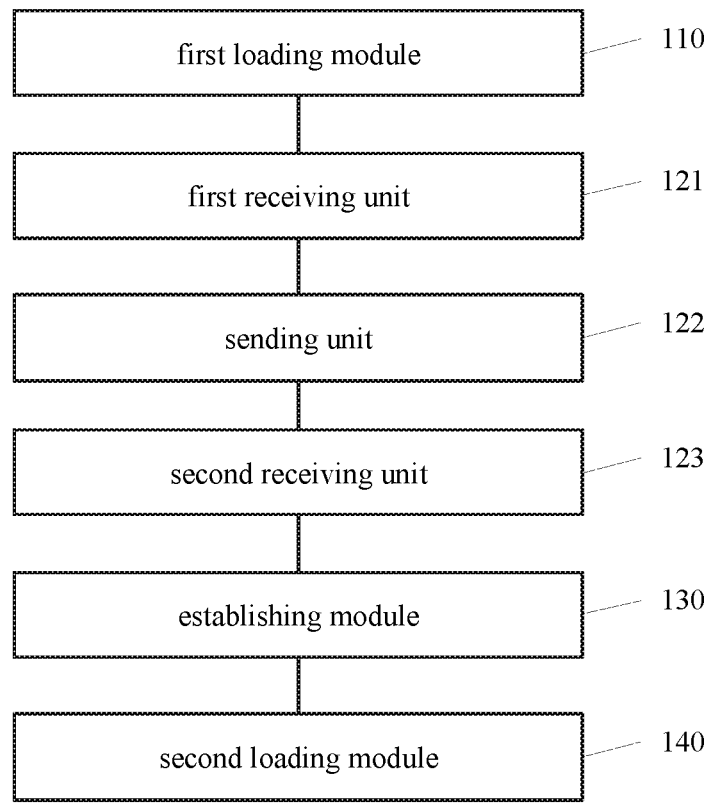
FIG. 5 is a block diagram illustrating a page displaying device based on an H5 webpage according to another embodiment of the present disclosure.

As illustrated in FIG. 5, in a possible embodiment, the obtaining module 120 of the embodiment of the present disclosure includes: a first receiving unit 121, a sending unit 122, and a second receiving unit 123.

The first receiving unit 121 is configured to receive interaction information. The interaction information includes at least one of speech interaction information, text interaction information and image interaction information, the image interaction information includes gesture interaction information.

The sending unit 122 is configured to send a request based on the interaction information. The request is configured to obtain content of an H5 page corresponding to the interaction information.

The second receiving unit 123 is configured to receive the content of the H5 page corresponding to the interaction information.

Functions of various modules and units in the page displaying device according to embodiments of the present disclosure is similar to principles of the page displaying method based on an H5 webpage according to above embodiments of the present disclosure, which are not elaborated herein.

Figure 6:
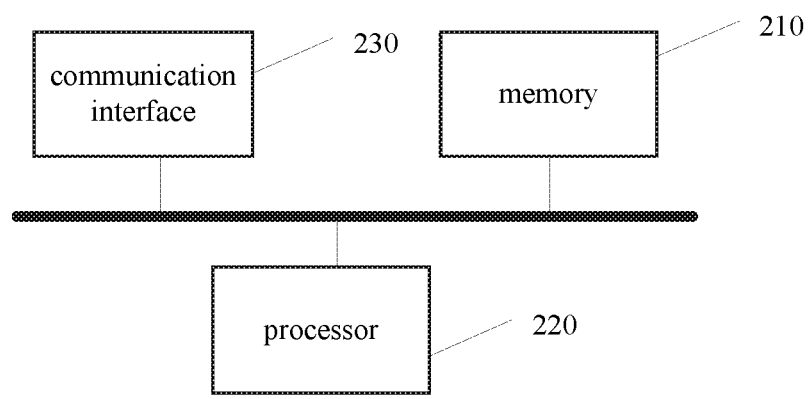
FIG. 6 is a schematic diagram illustrating components and structure of a page displaying apparatus based on an H5 webpage according to an embodiment of the present disclosure.

Embodiments of the present disclosure further provide a page displaying apparatus based on an H5 webpage. As illustrated in FIG. 6, the page displaying apparatus includes: a memory 210 and a processor 220. The memory 210 has computer programs executable by the processor 220 stored thereon. The processor 220 is configured to perform the page displaying method based on an H5 webpage in above embodiments when executing the computer programs. A number of the memory 210 and the processor 220 may be one or more.

The apparatus may further include: a communication 230, configured to communicate with an external device and to perform data interaction and communication.

The memory 210 may include a high-speed RAM memory, and may further include a non-volatile memory, such as at least one magnetic disk memories.

If the memory 210, the processor 220 and the communication interface 230 are implemented independently, the memory 210, the processor 220 and the communication interface 230 may be connected to each other through a bus and communicate with each other. The bus may be an Industry Standard Architecture (ISA) bus, a Peripheral Component Interconnect (PCI) bus, or an Extended Industry Standard Component (EISA) bus, etc. The bus may include an address bus, a data bus, a control bus, and the like. For ease of representation, only one bold line is shown in FIG. 6, but it does not mean that there is only one bus or one type of bus.

In some embodiments, in a specific implementation, if the memory 210, the processor 220 and the communication interface 230 are integrated on one chip, the memory 210, the processor 220 and the communication interface 230 may perform the communication with each other through an internal interface.

With above technical solutions according to embodiments of the present disclosure, all the H5 webpages may be loaded through one webview, after a main.html is provided, content of all the H5 webpages may be added into the file in a form of a tag of the html, occupying smaller memory, and displaying the content of the H5 webpages more quickly and smoothly. The displaying pattern of each interface and interaction modes of the user may be user-defined through Javascript and Css.

In the description of specification, "one embodiment," "some embodiments," "an example," "a specific example," or "some examples," means that a particular feature, structure, material, or characteristic described in connection with the embodiment or example is included in at least one embodiment or example of the present disclosure. Furthermore, the particular features, structures, materials, or characteristics may be combined in any suitable manner in one or more embodiments or examples. In addition, various embodiments or examples described in the specification and features of various embodiments or examples may be combined without departing from the scope of the present disclosure.

In addition, terms such as "first" and "second" are used herein for purposes of description and are not intended to indicate or imply relative importance or significance or to implicitly indicate the number of technical features indicated. Thus, the feature defined with "first" and "second" may explicitly or implicitly comprise one or more this feature. In the description of the present disclosure, "a plurality of" means two or more than two, unless specified otherwise.

It will be understood that, the flow chart or any process or method described herein in other manners may represent a module, segment, or portion of code that comprises one or more executable instructions to implement the specified logic function(s) or that comprises one or more executable instructions of the steps of the progress. In addition, it should be understood by those skilled in the art that the scope of the preferred embodiments of the present disclosure includes other implementations in which the functions may be performed in an order not shown or discussed, including a substantially simultaneous manner or in an opposite order depending on the functions involved.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium. The storage medium mentioned above may be read-only memories, magnetic disks, CD, etc.

The above is only the specific embodiment of the present disclosure, but the scope of the present disclosure is not limited thereto, and any person skilled in the art can easily think of various changes or alternatives within the technical scope of the present disclosure, these should be covered by the scope of the present disclosure. Therefore, the scope of the present disclosure should be determined by the scope of the appended claims.

What is claimed is:

1. A page displaying method based on an H5 webpage, comprising:
   loading a main page in a webpage view;
   obtaining content of an H5 webpage;
   establishing a page tag comprising: setting an operation button in the page tag based on a function provided by Javascript and/or Css, wherein the page tag comprises the content of the H5 webpage; and
   loading the page tag in the main page.

2. The method according to claim 1, wherein establishing the page tag comprises:
   setting a displaying pattern of the content of the H5 webpage based on a function provided by Javascript and/or Css; and
   establishing the page tag according to the displaying pattern.

3. The method according to claim 2, wherein obtaining the content of the H5 webpage comprises:
   receiving interaction information, wherein the interaction information comprises at least one of speech interaction information, text interaction information and image interaction information, the image interaction information comprises gesture interaction information;
   sending a request based on the interaction information, wherein the request is configured to obtain the content of the H5 page corresponding to the interaction information; and
   receiving the content of the H5 page corresponding to the interaction information.

4. The method according to claim 1, wherein obtaining the content of the H5 webpage comprises:
   receiving interaction information, wherein the interaction information comprises at least one of speech interaction information, text interaction information and image interaction information, the image interaction information comprises gesture interaction information;
   sending a request based on the interaction information, wherein the request is configured to obtain the content of the H5 page corresponding to the interaction information; and
   receiving the content of the H5 page corresponding to the interaction information.

5. The method according to claim 1, wherein obtaining the content of the H5 webpage comprises:
   receiving interaction information, wherein the interaction information comprises at least one of speech interaction information, text interaction information and image interaction information, the image interaction information comprises gesture interaction information;
   sending a request based on the interaction information, wherein the request is configured to obtain the content of the H5 page corresponding to the interaction information; and
   receiving the content of the H5 page corresponding to the interaction information.

6. A page displaying apparatus based on an H5 webpage, comprising:
   one or more processors; and
   a memory, configured to store one or more programs that, when executed by the one or more processors, cause the one or more processors to perform a page displaying method based on an H5 webpage, wherein the page displaying method comprises:
   loading a main page in a webpage view;
   obtaining content of an H5 webpage;
   establishing a page tag comprising: setting an operation button in the page tag based on a function provided by Javascript and/or Css, wherein the page tag comprises the content of the H5 webpage; and
   loading the page tag in the main page.

7. The apparatus according to claim 6, wherein establishing the page tag comprises:
   setting a displaying pattern of the content of the H5 webpage based on a function provided by Javascript and/or Css; and
   establishing the page tag according to the displaying pattern.

8. The apparatus according to claim 6, wherein obtaining the content of the H5 webpage comprises:
   receiving interaction information, wherein the interaction information comprises at least one of speech interaction information, text interaction information and image interaction information, the image interaction information comprises gesture interaction information;
   sending a request based on the interaction information, wherein the request is configured to obtain the content of the H5 page corresponding to the interaction information; and receiving the content of the H5 page corresponding to the interaction information.

9. The apparatus according to claim 7, wherein obtaining the content of the H5 webpage comprises:
  receiving interaction information, wherein the interaction information comprises at least one of speech interaction information, text interaction information and image interaction information, the image interaction information comprises gesture interaction information;
  sending a request based on the interaction information, wherein the request is configured to obtain the content of the H5 page corresponding to the interaction information; and
  receiving the content of the H5 page corresponding to the interaction information.

10. The apparatus according to claim 6, wherein obtaining the content of the H5 webpage comprises:
  receiving interaction information, wherein the interaction information comprises at least one of speech interaction information, text interaction information and image interaction information, the image interaction information comprises gesture interaction information;
  sending a request based on the interaction information, wherein the request is configured to obtain the content of the H5 page corresponding to the interaction information; and
  receiving the content of the H5 page corresponding to the interaction information.

11. A computer readable storage medium, having computer programs stored thereon that, when executed by a processor, cause the processor to perform a page displaying method based on an H5 webpage, wherein the page displaying method comprises:
  loading a main page in a webpage view;
  obtaining content of an H5 webpage;
  establishing a page tag comprising: setting an operation button in the page tag based on a function provided by Javascript and/or Css, wherein the page tag comprises the content of the H5 webpage; and
  loading the page tag in the main page.

12. The storage medium according to claim 11, wherein establishing the page tag comprises:
  setting a displaying pattern of the content of the H5 webpage based on a function provided by Javascript and/or Css; and
  establishing the page tag according to the displaying pattern.

13. The storage medium according to claim 12, wherein obtaining the content of the H5 webpage comprises:
  receiving interaction information, wherein the interaction information comprises at least one of speech interaction information, text interaction information and image interaction information, the image interaction information comprises gesture interaction information;
  sending a request based on the interaction information, wherein the request is configured to obtain the content of the H5 page corresponding to the interaction information; and
  receiving the content of the H5 page corresponding to the interaction information.

14. The storage medium according to claim 11, wherein obtaining the content of the H5 webpage comprises:
  receiving interaction information, wherein the interaction information comprises at least one of speech interaction information, text interaction information and image interaction information, the image interaction information comprises gesture interaction information;
  sending a request based on the interaction information, wherein the request is configured to obtain the content of the H5 page corresponding to the interaction information; and
  receiving the content of the H5 page corresponding to the interaction information.

15. The storage medium according to claim 11, wherein obtaining the content of the H5 webpage comprises:
  receiving interaction information, wherein the interaction information comprises at least one of speech interaction information, text interaction information and image interaction information, the image interaction information comprises gesture interaction information;
  sending a request based on the interaction information, wherein the request is configured to obtain the content of the H5 page corresponding to the interaction information; and
  receiving the content of the H5 page corresponding to the interaction information.

* * * * *